United States Patent
Lenderink et al.

(10) Patent No.: US 8,414,138 B2
(45) Date of Patent: Apr. 9, 2013

(54) ILLUMINATION DEVICE

(75) Inventors: Egbert Lenderink, Waalre (NL); Marco Van As, Waalre (NL); Petrus J. M. Burgt, Valkenswaard (NL)

(73) Assignee: Koninklijke Philipe Electronics N.V., Eindhoven (NL)

( * ) Notice: Subject to any disclaimer, the term of this patent is extended or adjusted under 35 U.S.C. 154(b) by 0 days.

(21) Appl. No.: 13/126,196

(22) PCT Filed: Nov. 3, 2009

(86) PCT No.: PCT/IB2009/054874
§ 371 (c)(1),
(2), (4) Date: Apr. 27, 2011

(87) PCT Pub. No.: WO2010/052640
PCT Pub. Date: May 14, 2010

(65) Prior Publication Data
US 2011/0205733 A1    Aug. 25, 2011

(30) Foreign Application Priority Data
Nov. 6, 2008 (EP) .................................... 08168442

(51) Int. Cl.
*F21V 9/00* (2006.01)
(52) U.S. Cl. ................. 362/84; 362/231; 362/249.02
(58) Field of Classification Search .................. 362/84, 362/231, 293, 249.02; 257/89, 98; 313/502, 313/503; 315/307–309
See application file for complete search history.

(56) References Cited

U.S. PATENT DOCUMENTS

| 6,234,648 | B1 * | 5/2001 | Borner et al. ................. 362/235 |
| 7,005,679 | B2 * | 2/2006 | Tarsa et al. ...................... 257/89 |
| 7,938,550 | B2 * | 5/2011 | Takenaka .......................... 362/3 |
| 2004/0207313 | A1 | 10/2004 | Omoto et al. |
| 2005/0211992 | A1 * | 9/2005 | Nomura et al. ................. 257/79 |
| 2006/0261742 | A1 | 11/2006 | Ng et al. |
| 2007/0146639 | A1 | 6/2007 | Conner |
| 2008/0246419 | A1 | 10/2008 | Deurenberg |

FOREIGN PATENT DOCUMENTS

| DE | 102008015712 A1 | 10/2008 |
| JP | 2000275636 A | 10/2000 |

* cited by examiner

Primary Examiner — Thomas Sember
(74) *Attorney, Agent, or Firm* — David Zivan; Mark Beloborodov

(57) ABSTRACT

The invention relates to an illumination device (1), comprising: at least one LED (3) having an emission maximum in a first wavelength range; at least one LED (2) having an emission maximum in a second wavelength range; and a wavelength converting material (5) arranged to receive light of at least said first light wavelength range and having an emission maximum in a third wavelength range which is between said first wavelength range and said second wavelength range. The illumination device according to the invention may provide white light of acceptable overall color rendering while producing particularly high saturation of selected colors.

14 Claims, 3 Drawing Sheets

ILLUMINATION DEVICE

FIELD OF THE INVENTION

The present invention relates to an illumination device comprising at least one LED adapted to emit light having an emission maximum in a first wavelength range, at least one LED adapted to emit light having an emission maximum in a second wavelength range, and a wavelength converting material.

BACKGROUND OF THE INVENTION

In many instances such as retail or trade fairs it is desirable to present articles, e.g. fresh food, in an attractive way. With regard to illumination, usually this means that the colors of the articles should be enhanced, in other words that the articles should produce more saturation of color. Today usually compact high intensity discharge lamps, such as ultra high pressure sodium lamps (HID lamps) or special fluorescent lamps are used for this purpose. In the case of an ultra high pressure sodium lamp an additional filter is often used to obtain the required saturation, leading however to low system efficacy. Furthermore, since the emitted light is not white, a HID lamp must be placed near the merchandise to be illuminated, so that other objects are not illuminated unfavorably. Another disadvantage of today's HID lamps is that they emit a lot of heat, which is undesirable e.g. in the illumination of food articles, since the shelf life of the articles is reduced. Additionally the ultra high pressure sodium lamps have a short life (approximately 6000 hours) and are not stable in color over this life span.

Drawbacks of the fluorescent lamps include their linear size and length, limiting the application possibilities.

A light-emitting diode (LED) based solution can in principle be used to overcome the above disadvantages. By combining LEDs having different spectral outputs in the desired proportion, e.g. blue, green, amber and red, a total spectral output giving saturation of certain colors can be obtained. However, drawbacks of this solution include low efficiency and complexity of the system, as the use of different colors of LEDs leads to complex binning issues. In general lighting applications, some disadvantages of systems with LEDs of different colors can be overcome by using only blue LEDs and conversion of part of the blue light by a phosphor (wavelength converting material) to obtain white light output. However, White LEDs based on blue light converting phosphors generally exhibit a broad emission spectrum, and thus high saturation of colors cannot be achieved.

Thus, there is a need in the art for an improved illumination device by which high saturation of colors can be achieved, which is efficient and which exhibits acceptable color stability.

SUMMARY OF THE INVENTION

It is an object of the invention to provide an improved illumination device; in particular, it is an object of the invention to provide an illumination device which may provide white light producing high saturation of selected colors.

Thus, in one aspect the invention relates to an illumination device comprising at least one LED adapted to emit light having an emission maximum in a first wavelength range; at least one LED adapted to emit light having an emission maximum in a second wavelength range; and a wavelength converting material arranged to receive light of at least said first light wavelength range and having an emission maximum in a third wavelength range which is between said first wavelength range and said second wavelength range. The illumination device according to the invention may emit white light of acceptable overall color rendering while producing particularly high saturation of selected hues.

Said first wavelength range may be from 400 to 480 nm, and typically is from 420 to 460 nm; thus, the LED having an emission maximum in a first wavelength range typically is blue LED. The second wavelength range may be from 600 to 680 nm, typically from 610 to 670 nm, and especially from 620 to 665 nm; that is, the LED having an emission maximum in a second wavelength range may be a red LED.

Furthermore, said third wavelength range may be from 480 to 600 nm, typically from 500 to 580 nm, and especially from 500-560. By thus combining a blue LED, a blue-to-green converting phosphor and a red LED, white light producing high saturation of green and red hues may be obtained. Also, high color point stability of the emitted light may be obtained.

In embodiments of the invention, the illumination device comprises at least one LED adapted to emit light having an emission maximum in a first subrange of said second wavelength range, and at least one LED adapted to emit light having an emission maximum in a second subrange of said second wavelength range. By combining LEDs having emission maxima in different subranges, the characteristics of the light emitted by the illumination device may be adapted with respect to e.g. luminous efficacy and red saturation. For example, said first subrange may be from 615 to 635 nm, and typically from 620 to 630 nm; by thus increasing the emission of short wavelength red light, the luminous efficacy of the device may be increased. Said second subrange may from 635 to 670 nm, and typically from 643 to 665 nm; by thus increasing the intensity of long wavelength red light, red color saturation may be enhanced. The inventors have found that combining the above subranges in particular may provide a good balance between red saturation and efficacy. Furthermore, by providing the full red spectral range the overall color rendering may be improved.

In embodiments of the invention, said second wavelength range may be from 625 to 650 nm, and preferably from 630 to 643 nm. In particular when using only one red LED or a plurality of red LEDs having emission maxima at substantially the same wavelength, the above ranges have been found to offer particularly good balance between red saturation and efficacy.

Furthermore, the wavelength converting material may comprise the elements Lu, Al, O and Ce and/or Y. The wavelength converting material can provide efficient and relatively color point stable conversion of light of the first wavelength range to light of the third wavelength range.

Furthermore, in the illumination device, the at least one LED adapted to emit light having an emission maximum in a first wavelength range and the wavelength converting material may be arranged mutually spaced apart. Thus, the wavelength converting material may be less exposed to the elevated working temperatures of the LEDs, hence reducing or avoiding thermal quenching of the wavelength converting material. For example, the wavelength converting material may be arranged in a light exit window of the illumination device.

Alternatively, the wavelength converting material may be arranged on said at least one LED adapted to emit light having an emission maximum in a first wavelength range, or the wavelength converting material may be comprised in a plate arranged on said at least one LED adapted to emit light having an emission maximum in a first wavelength range.

Typically, the optical characteristics of LEDs change when the LEDs rise in temperature during operation so as to decrease the flux output and shift the wavelength of emission maximum. Hence, the color coordinates of the mixed light emitted by the illumination device may change as the working temperature increases. Therefore, it may be desirable to use a control circuit which compensates for temperature-induced shifts in emission wavelength. Accordingly, with reference to FIG. 4, in embodiments of the invention, the illumination device may further comprise a control system 400 comprising at least one color sensor 402 adapted to provide first control data representing the color of the mixed color light produced by the LEDs, and a control unit 404 for deriving the temperature of each LED, compensating set point values in accordance with second control data including said temperatures, and controlling the LEDs in accordance with the differences between the set point values and the first control data. Such a control system may further improve the color point stability of the light emitted by the illumination device by compensating for temperature-induced shifts in the emission maximum wavelength of an LED. Thus, by appropriately controlling the at least one LED adapted to emit light having an emission maximum in the first wavelength range, efficient wavelength conversion by the wavelength converting material can be achieved at all working temperatures of the LED. Furthermore, by appropriately controlling the at least one LED adapted to emit light having an emission maximum in the second wavelength range, a desired balance between overall color rendering, luminous efficacy and red saturation may be maintained at all working temperatures of the LED.

BRIEF DESCRIPTION OF THE DRAWINGS

These and other aspects of the present invention will now be described in more detail, with reference to the appended drawings showing currently preferred embodiments of the invention, in which.

DETAILED DESCRIPTION OF THE INVENTION

Figure 1:
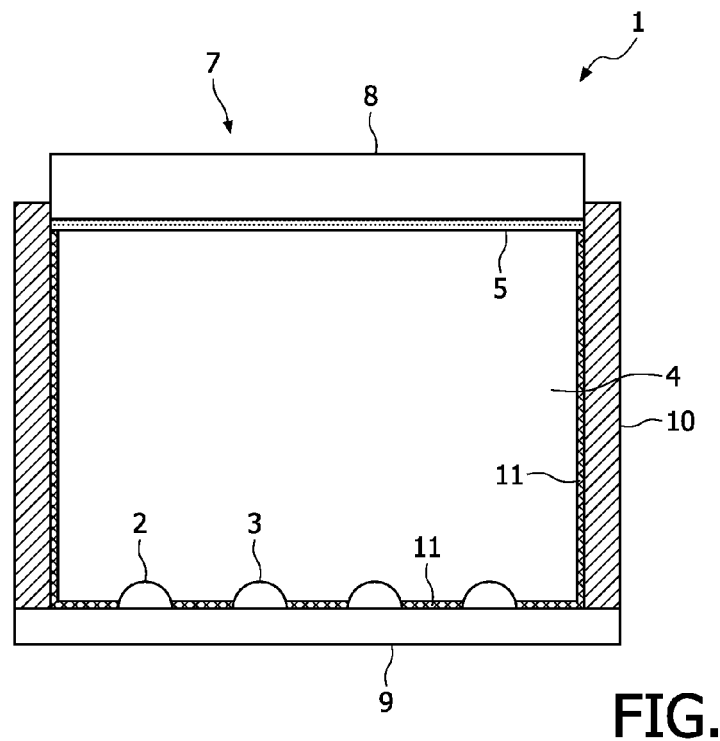
FIG. 1 is a schematic cross-sectional view of an illumination device according to an embodiment of the invention.

FIG. 1 schematically shows an illumination device according to an embodiment of the invention. The illumination device 1 comprises a light source 2 having an emission maximum in a wavelength range of from 600 to 680 nm. The light source 2 comprises at least one LED adapted to emit light having an emission maximum in said wavelength range, typically in the range of from 610 to 670 nm, and especially from 620 to 665 nm. Such an LED is hereinafter referred to as a red LED. Typically, the at least one LED not only has an emission maximum in a range indicated above, but the full emission spectrum of said at least one LED may be in a range indicated above, especially the range of from 620 to 665 nm. The light source 2 may also comprise a non-LED light source, such as an incandescent lamp and/or a fluorescent lamp, provided that the light source has an emission maximum in said wavelength range.

In addition to the light source 2, the illumination device 1 also comprises at least one LED 3 having an emission maximum in the wavelength range of from 400 to 480 nm, typically in the range of 420 to 460 nm and especially from 440 to 455 nm, hereinafter referred to as a blue LED.

In the embodiment shown in FIG. 1, the at least one red LED 2 and the at least one blue LED 3 are arranged in an optical chamber 4, which is at least partly defined by a supporting substrate 9 and a side wall 10, and adapted to emit light into said optical chamber 4. The illumination device 1 further comprises a light exit window 7. A translucent plate 8 optionally having diffusive properties, or an optical element such as a light guide, may be arranged in the exit window 7. The substrate 9 and/or the side wall 10 may be coated with a reflective material 11 for redirecting light incident upon said substrate and/or side wall towards the wavelength converting material 5 and/or the light exit window 7, thus improving the efficiency of the device.

A wavelength converting material 5 is arranged to receive the light from the at least one blue LED 3. The wavelength converting material 5 is adapted to absorb light in the range of 400 to 480 nm, so that at least part of the light emitted by the at least one blue LED 3 is absorbed by the wavelength converting material 5. Preferably, the wavelength converting material 5 has an absorption maximum at a wavelength in the range of 400 to 480 nm, and more preferably at a wavelength close to the wavelength of the emission maximum of the at least one blue LED 3. Furthermore, the wavelength converting material 5 has an emission maximum in the wavelength range of 480 to 600 nm, typically from 500 to 580 nm and especially from 500 to 560 nm. Thus, at least part of the light emitted by the at least one LED 3 may be absorbed by the wavelength converting material 5 and re-emitted as green or greenish light. The light emitted by the at least one blue LED 3 that is received but not absorbed by the wavelength converting material may be transmitted through the wavelength converting material.

The wavelength converting material 5 may also receive at least part of the light emitted by the at least one red LED 2 having an emission maximum and/or a full emission spectrum as indicated above. However, light emitted by the LED 2 is typically not absorbed by the wavelength converting material, but (at least partly) transmitted therethrough. The wavelength converting material 5 will be described in further detail below.

Thus, the light emitted by the illumination device 1 is a combination of light emitted by the at least one red LED 2, non-converted light emitted by the at least one blue LED 3, and light emitted by the wavelength converting material 5. This combination yields white light producing high color saturation of green and red hues upon the illumination of green or red objects, respectively. Also, the color rendering index (CRI) of the emitted light is acceptable. For example, the illumination device may have a color rendering index of about 70.

The color temperature of the light produced by the illumination device may be from about 3000 to about 4000 K; however white light of other color temperatures may also be produced by an illumination device according to embodiments of the invention.

Figure 3:
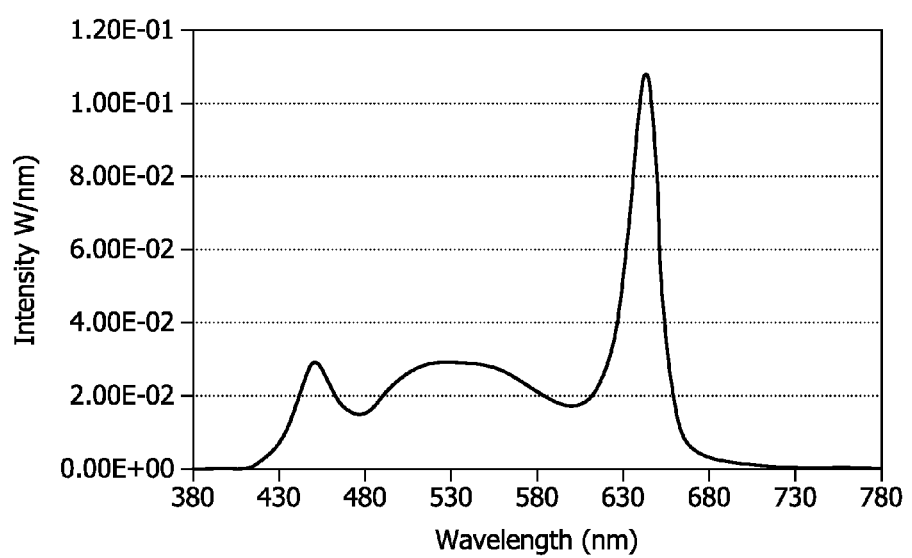
FIG. 3 is a graph showing an example spectrum (intensity vs. wavelength) of an illumination device according to an embodiment of the invention.

A typical spectrum (intensity vs. wavelength) of the light emitted by an illumination device according to an embodiment of the invention is presented in FIG. 3, in which the respective contributions of blue LEDs, wavelength converting material and red LEDs can be seen as intensity peaks.

In embodiments of the invention the light source 2 having an emission maximum in a wavelength range of from 600 to 680 nm may comprise a plurality of LEDs, each LED having an emission maximum in said range, typically in the range of from 625 to 650 nm, for example from 630 to 643 nm. The inventors have found that an emission maximum in the above wavelength range, and in particular in the range of from 630 to 643 nm, may yield a good balance between saturation of red hues and luminous efficacy.

Furthermore, by combining red LEDs having emission maxima in different subranges of the above range of 600 to 680 nm, the characteristics of the light emitted by the illumination device may be adapted. The human eye is more responsive to some wavelengths of the visible spectrum of light than others. For example, the human eye is most responsive to wavelengths around 555 nm, and the least responsive to the shorter and the longest wavelengths of the visible spectrum. For example, the human eye is more responsive to light in the wavelength range of 600-630 nm than to light of 630-700 nm. The fraction of electromagnetic power which is useful for lighting, is called the luminous efficacy (expressed in lm/W), and thus depends on the wavelength of the light. By increasing the short wavelength red light (600-630 nm) emitted by the red LEDs, the luminous efficacy of the light emitted by the illumination device may be improved. Furthermore, the ratio of the total luminous flux emitted by an illumination device to the total amount of input power is referred to as overall luminous efficacy (also expressed in lm/W). Thus, by using LEDs selectively supplying short wavelength red light instead of the full red light spectrum, the overall luminous efficacy may be increased.

Furthermore, red color saturation may be enhanced by increasing the intensity of long wavelength red light (wavelength range of 630-700 nm). Also, the overall color rendering may be enhanced by providing the full red spectral range. Hence, using two different emission ranges, an improved balance of properties may be achieved. For example, the light source 2 having an emission maximum in a wavelength range of from 600 to 680 nm may comprise a plurality of LEDs, some of which having an emission maximum in the subrange of from 615 to 635 nm, typically from 620 to 630 nm, and some of which having an emission maximum in the subrange of from 635 to 670 nm, typically from 643 to 665 nm.

The wavelength converting material used in the device according to the invention may be any wavelength converting material known in the art having an absorption maximum in the range of from 400 to 480 nm, preferably close to the emission maximum of the blue LED 3, and an emission maximum in the range of from 480 to 600 nm, typically from 500 to 560 nm. Typically, the wavelength converting material comprises the elements lutetium (Lu), aluminum (Al), oxygen (O) and optionally cerium (Ce) or yttrium (Y). For example, the wavelength converting material may be LuAG:Ce or LuAG:Y. The notations ":Ce" and ":Y" indicate that part of the metal ions (in this case, part of the Lu ions) in the wavelength converting material is replaced by Ce or Y, respectively. Ce will replace Lu in general for not more than 10%; in general, the Ce concentration will be in the range of from 0.1 to 4%, especially from 0.1 to 3.3%, for example from 0.1 to 2% (relative to Lu). Ce in garnets is substantially or only in the trivalent state. An example of an approximate stochiometric formula for the wavelength converting material may be $Lu_3Al_5O_{12}$. Furthermore, when Y is present in the wavelength converting material it may replace Lu typically for 5-50%. Doping with Y typically produces a shift of the emission spectrum of the wavelength converting material which may increase the efficiency of the illumination device, but also reduce the saturation of green and red hues.

In the embodiment shown in FIG. 1, the wavelength converting material 5 and the LEDs 2, 3 are arranged mutually spaced apart. Thus, the wavelength converting material may be less exposed to the elevated working temperatures of the LEDs, hence reducing or avoiding thermal quenching of the wavelength converting material. Also, light from several blue LEDs may be mixed in the optical chamber 4 before reaching the wavelength converting material, so that differences in emission characteristics between individual LEDs may be averaged out, leading to less or no visible artifacts.

Figure 2:
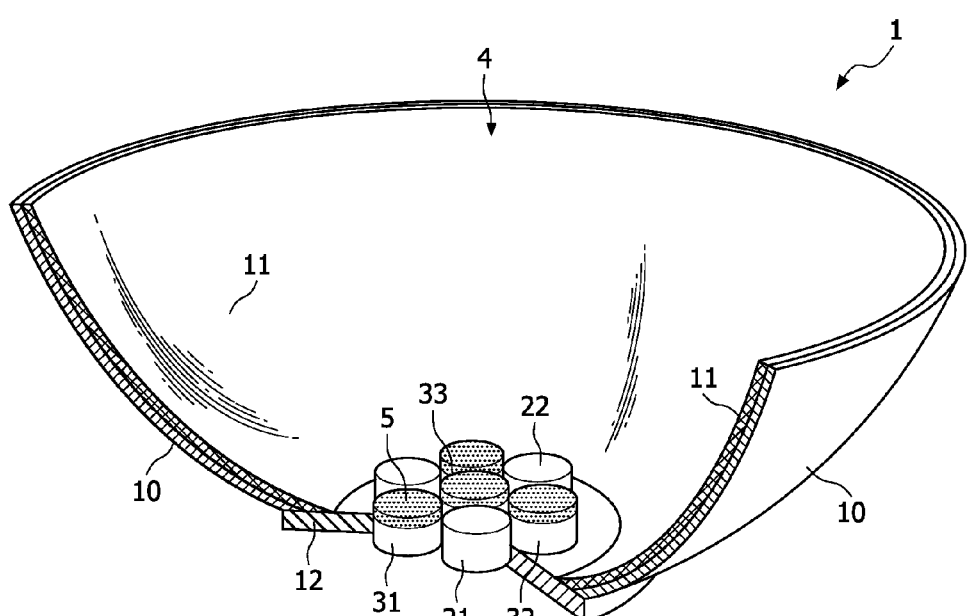
FIG. 2 is a schematic perspective view of an illumination device according to another embodiment of the invention.

Another embodiment of illumination device of the invention is shown in FIG. 2, comprising a plurality of LEDs 21, 22, 23 having an emission maximum in said wavelength range of from 600 to 680 nm arranged on a supporting substrate 9. For example, two or more of the LEDs 21, 22, 23 could have emission maxima in different subranges as described above. The LEDs 21, 22, 23 are surrounded by a side wall 10 comprising a reflective coating 11. The side wall 10 is curved and thus forms a cup-shaped structure. However, a side wall of the illumination device 1 may have any suitable shape.

The illumination device 1 also comprises a plurality of LEDs 31, 32, 33 having an emission maximum in said first wavelength range arranged on the supporting structure. Furthermore, a portion of wavelength converting material 5 is arranged on each LED 31, 32, 33 to receive light emitted by the LED. For example, the portion of wavelength converting material 5 may be in the form of a ceramic plate or a powder and may optionally comprise additional material, such as a binder or a scattering material. The wavelength converting material 5 may be applied directly onto the LED die.

The illumination device 1 may further comprise a control unit comprising a control circuit for controlling the color point stability of the light emitted by the illumination device 1. Typically, the optical characteristics of LEDs change when the LEDs rise in temperature during operation so as to decrease the flux output and shift the wavelength of emission maximum. Hence, the color coordinates of the mixed light emitted by the illumination device 1 may change as the working temperature increases. Thus, it may be desirable to use a control circuit which compensates for temperature-induced shifts in emission wavelength.

Examples of color control systems or algorithms that may be used include color coordinates feedback (CCFB), temperature feed forward (TFF), flux feedback (FFB), and combinations thereof, in particular a combination of flux feedback and temperature feedforward (FFB+TFF). For example, in CCFB, sensors such as filtered photodiodes are used to feed back the color coordinates of the emitted light of mixed colors, and the color coordinates are then compared to reference or set point values representing a desired mixed color light. The light sources emitting light of different colors are subsequently controlled in accordance with the derived differences. For example, the color distribution may be adjusted by controlling the relative intensities of the LEDs. Control systems which use a temperature feed forward loop are described in US2008/0246419. For example, the control system may calculate the temperature of the LEDs by measuring the temperature of a heat sink that is thermally connected to the LEDs and using a thermal model of the LEDs, and take into account the calculated operating temperature of the LEDs and the resulting shifts in emission wavelength when determining the reference or set point values.

Figure 4:
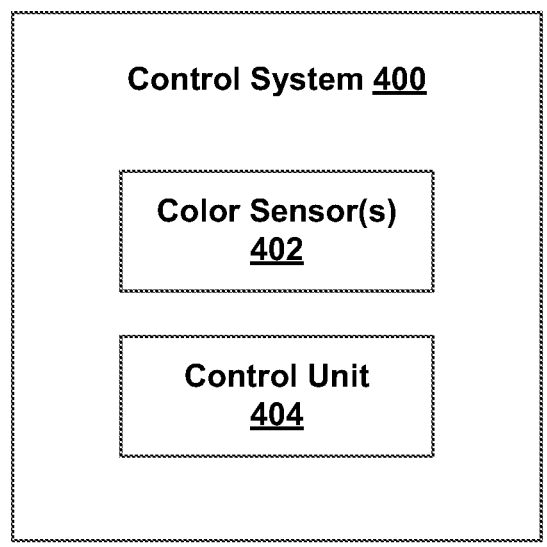
FIG. 4 is a high-level block diagram of a control system according to an embodiment of the invention.

In particular, referring to FIG. 4, a LED based illumination device according to embodiments of the invention may comprise at least one color sensor 402 adapted to provide first control data representing the color of the mixed color light produced by the light sources, and a control unit 404 for deriving the temperature of each LED, compensating set point values in accordance with second control data including said LED temperatures and controlling the LEDs in accordance with the differences between the set point values and the first control data. Thus, by appropriately controlling the at least one LED adapted to emit light having an emission maximum in the second wavelength range, a desired balance between overall color rendering, luminous efficacy and red saturation may be maintained at any working temperature of the LED. Also, a desired level of wavelength conversion may be achieved at any working temperature by appropriately controlling the at least one LED adapted to emit light having an emission maximum in the second wavelength range.

The skilled person realizes that the present invention by no means is limited to the preferred embodiments described above. On the contrary, many modifications and variations are possible within the scope of the appended claims.

The invention claimed is:

1. Illumination device, comprising:
   at least one light emitting diode (LED) adapted to emit light having an emission maximum in a first wavelength range;
   at least one LED adapted to emit light having an emission maximum in a first subrange of a second wavelength range;
   at least one LED adapted to emit light having an emission maximum in a second subrange of the second wavelength range; and
   a wavelength converting material arranged to receive light of at least said first wavelength range and having an emission maximum in a third wavelength range which is between said first wavelength range and said second wavelength range.

2. Illumination device according to claim 1, wherein said first wavelength range is from 400 to 480 nm.

3. Illumination device according to claim 1, wherein said second wavelength range is from 600 to 680 nm.

4. Illumination device according to claim 1, wherein said third wavelength range is from 480 to 600 nm.

5. Illumination device according to claim 1, wherein said wavelength converting material comprises the elements Lu, Al, O and Ce and/or Y.

6. Illumination device according to claim 1, wherein said at least one LED having an emission maximum in a first wavelength range and said wavelength converting material are arranged mutually spaced apart.

7. Illumination device according to claim 6, wherein said wavelength converting material is arranged in a light exit window of the illumination device.

8. Illumination device according to claim 1, wherein the wavelength converting material is arranged on said at least one LED having an emission maximum in a first wavelength range.

9. Illumination device according to claim 8, wherein said wavelength converting material is comprised in a plate arranged on said at least one LED having an emission maximum in a first wavelength range.

10. Illumination device according to claim 1, further comprising a control system comprising at least one color sensor adapted to provide first control data representing the color of the mixed color light produced by the LEDs and a control unit for deriving the temperature of each LED, compensating set point values in accordance with second control data including said temperatures and controlling the LEDs in accordance with the differences between the set point values and the first control data.

11. Illumination device according to claim 1, wherein
    said first wavelength range is from 420 nm to 460 nm,
    said second wavelength range is from 620 nm to 665 nm, and
    said third wavelength range is from 500 to 560 nm.

12. Illumination device according to claim 11, wherein said second wavelength range is from 625 to 650 nm.

13. Illumination device according to claim 1, wherein the second wavelength range is a red wavelength range.

14. Illumination device according to claim 13, wherein said first subrange is from 615 to 635 nm and said second subrange is from 635 to 670 nm.

* * * * *